(12) United States Patent
Bartlett et al.

(10) Patent No.: US 10,084,844 B2
(45) Date of Patent: Sep. 25, 2018

(54) SYSTEM AND METHOD FOR IMPROVED USER-CONTROLLED ELECTRONIC FILE AND TRASH MANAGEMENT

(71) Applicant: International Business Machines Corporation, Armonk, NY (US)

(72) Inventors: Nicholas T. Bartlett, Chapel Hill, NC (US); David J. Claborn, Raleigh, NC (US); Jason C. Garcowski, Raleigh, NC (US); Yuvaraj T. Patil, Bangalore (IN); Vijay Suswaram, Bangalore (IN); Mirtunjay Sharma, Sengkang (SG)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 331 days.

(21) Appl. No.: 14/942,588

(22) Filed: Nov. 16, 2015

(65) Prior Publication Data

US 2017/0139941 A1    May 18, 2017

(51) Int. Cl.
*G06F 17/30* (2006.01)
*H04L 29/08* (2006.01)

(52) U.S. Cl.
CPC ........ *H04L 67/02* (2013.01); *G06F 17/30082* (2013.01); *H04L 67/06* (2013.01)

(58) Field of Classification Search
CPC ......... G06F 17/30091; G06F 17/30117; G06F 17/30138; G06F 17/30144; G06F 17/30286; G06F 12/0253; G06F 12/0276; G06F 17/30082; H04L 67/02; H04L 67/06

USPC ....... 707/628, 631, 632, 634, 662, 663, 666, 707/672, 812, 813, 816, 817, 819; 709/224; 711/118

See application file for complete search history.

(56) References Cited

U.S. PATENT DOCUMENTS

| | | | |
|---|---|---|---|
| 8,627,500 B2 | 1/2014 | Rogel et al. | |
| 9,251,257 B2* | 2/2016 | Johnson | G11B 27/034 |
| 9,614,912 B2* | 4/2017 | Shetty | H04L 67/1097 |
| 2002/0049853 A1* | 4/2002 | Chu | H04L 29/06 709/237 |
| 2002/0091836 A1 | 7/2002 | Moetteli | |
| 2010/0057884 A1 | 3/2010 | Brownell et al. | |
| 2010/0306173 A1* | 12/2010 | Frank | G06F 9/45558 707/640 |
| 2011/0295978 A1* | 12/2011 | Pazos | H04H 20/426 709/219 |
| 2012/0102004 A1 | 4/2012 | Johnson et al. | |
| 2012/0331389 A1 | 12/2012 | Violet, Sr. | |

(Continued)

OTHER PUBLICATIONS

Anonymously; "An optimized architecture of web-service-based file recognition, file manipulation and management in cloud disk environments"; IP.com Prior Art Database Technical Disclosure; <http://ip.com/IPCOM/000232534>; Nov. 15, 2013, pp. 1-17.

*Primary Examiner* — Greta L Robinson
(74) *Attorney, Agent, or Firm* — Patterson + Sheridan, LLP

(57) ABSTRACT

Techniques are disclosed for automatically deleting files downloaded and designated as temporary use. In response to a request to download a file and open in a second application, a web browser or other client ascertains whether the file should be deleted after use in the second application. If the file is designated for temporary use, then the client monitors the application accessing the file. When the file is closed, the client deletes the file.

20 Claims, 6 Drawing Sheets

(56) References Cited

U.S. PATENT DOCUMENTS

2013/0275586 A1* 10/2013 Luna .................... H04W 24/04
                                                                709/224

* cited by examiner

SYSTEM AND METHOD FOR IMPROVED USER-CONTROLLED ELECTRONIC FILE AND TRASH MANAGEMENT

BACKGROUND

The present disclosure relates to managing files retrieved over computer networks, and more specifically, to automatically deleting files after the user is finished with them.

When a user chooses to download a file in a browser, chat client, email client, or other application, the resulting downloaded file is frequently opened by a second application. The downloaded file is typically saved into a download folder. Over time, this folder stores many previously downloaded files. In many cases, a given file may be only needed once. However these files remain in the download folder, taking up space and cluttering the storage system. Further, there could be a security risk in unnecessarily keeping sensitive files. The user must keep track of which files to keep and which files to delete, which can be a difficult task, wastes time, and is often neglected. Further complicating this problem is the nature of the file names. Many times the files downloaded from online services have names that give little information to the user about the contents of the file or whether the file should be kept. Deciding whether to keep a file often requires a user to reopen a file, wait for the application to load, determine the contents of the file, determine if the file should be deleted, locate the file in the download folder, and manually delete the file.

Current solutions are inadequate to address the problems associated with downloaded files. One solution involves keeping multiple download folders, requiring the user to switch back and forth between the two folders depending on the expected use of the file. The user must remember to change the target download folder depending on whether the file is for temporary use. Another solution is to routinely empty the download folder, essentially making all downloaded files temporary use only. This method deletes files that the user wishes to keep, if the file hasn't been manually saved to another folder. Current solutions are tedious, time consuming, and waste storage space.

SUMMARY

One embodiment presented herein describes a method. The method generally includes receiving, via a processor, a request to download a file. The method also includes ascertaining whether a file is intended for temporary use in a second application and determining when the second application is finished interacting with the file. After the second application is finished interacting with the file, the file is deleted.

Another embodiment presented herein describes a system having a processor and a memory storing a program, which, when executed on the processor, performs an operation. The operation itself generally includes receiving a request to download a file. The method also includes ascertaining whether a file is intended for temporary use in the second application and determining when the second application is finished interacting with the file. After the second application is finished interacting with the file, the file is deleted.

Another embodiment presented herein describes a computer program product having computer-readable program code configured to perform an operation. The operation itself generally includes receiving, via a processor, a request to download a file. The method also includes ascertaining whether a file is intended for temporary use in a second application and determining when the second application is finished interacting with the file. After the second application is finished interacting with the file, the file is deleted.

DETAILED DESCRIPTION

Embodiments presented herein describe techniques for automatically deleting certain files once a user completes interacting with them. More specifically, techniques presented herein disclose ascertaining whether a file is intended for temporary use, determining when the file is no longer open, and deleting the file. For example, a system may delete a file that the user intends to view only once, preventing the file from cluttering a download folder or otherwise remaining in storage unnecessarily.

In one embodiment, a user selects a file to download from a web page rendered in a browser; the browser determines whether the file is for temporary use. For example, the browser may prompt the user whether to save the file, or open in a second application. For example, if the file is to be opened by that second application, the download prompt may include an option to delete after using the file. The browser may have a default setting to specify files selected for download as being temporary unless otherwise indicated. The browser maintains a list of files to delete when once closed (e.g., when the second application no longer has an open file handle to a file downloaded by a browser and launched in the second application). The browser tracks whether a downloaded file is open in the second application and deletes such files once closed in the second application.

In one embodiment, when a user closes a file marked as a temporary download by the browser, the browser deletes that file. For example, the user may close the file, while continuing to use the second application or close the second application. In either case, the file is closed, and the browser responds by deleting the file (if marked for temporary use by the second application). Deleting the file automatically when the user is finished with the file prevents the temporary files from building up in a download folder, saving the user time and effort managing the files. Automatically deleting the temporary file also saves storage space that may be valuable to the user.

Figure 1:
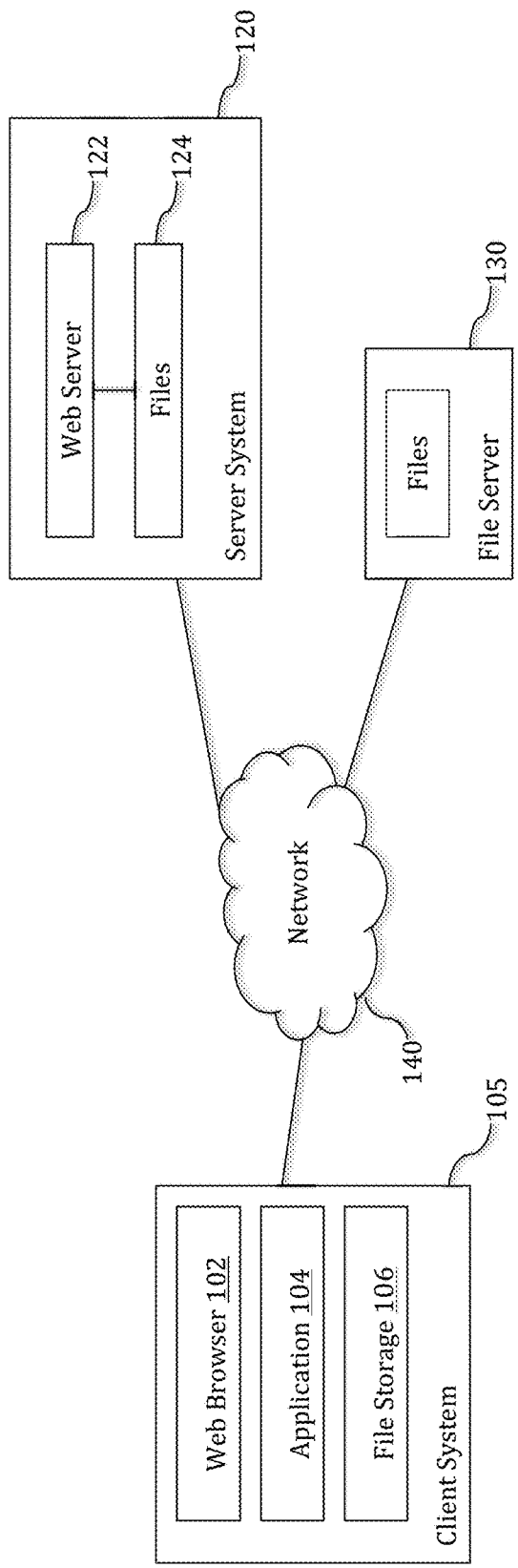
FIG. 1 illustrates an example computing environment, according to one embodiment.

FIG. 1 illustrates an example computing environment 100, according to one embodiment. As shown, the computing environment 100 includes a client system 105. The client system 105 connects to network 140 and processes, views, and stores files downloaded from network 140. The client system 105 may be a physical computing system or a virtual machine instance in a computing cloud.

Further, the client system 105 includes a web browser 102, application 104, and file storage 106. The web browser 102 allows users to, via network 140, access files stored in a server system 120 or in a file server 130. Although a web browser is used as an example, those of ordinary skill in the art will recognize that web browser 102 could be replaced by an email client, chat client, or any other program that downloads files from a network to be launched in another application. Application 104 opens files retrieved by web browser 102. Web browser 102 may save files in file storage 106. For example, web browser 102 may download a file, save that file in file storage 106, and send that file to application 104 for use.

In one embodiment, browser 102 allows the user to designate a downloaded file for temporary use. Web browser 102 may track files downloaded for temporary use and monitor the application 104 using the file. Web browser 102 can delete the file when application 104 is no longer accessing the file. For example, a user may choose to download a document and elect to delete the document after viewing, by designating the document a temporary file as part of the download and launching process (or as part of a general preference for files downloaded in the browser. Generally, if a file marked for temporary use is closed, the file is automatically deleted. However, there may be an option for a user to view files marked for temporary use and reverse the selection before the file is closed. The browser may keep a log of files marked for temporary use so that if the browser is closed, then when the browser is next launched, the browser can ascertain whether there are temporary files from a previous session that need to be deleted.

In one embodiment, the web browser 102 monitors the application 104 using the temporary file within the browser process. The browser monitors the application using the file, and upon determining the user has closed the temporary file, the browser deletes the temporary file.

In one embodiment, the browser is configured to monitor files downloaded for temporary use as part of the browser process itself. Alternatively, however, the web browser 102 may launch a second process to monitor the application 104 using the temporary file. Such an action may be useful in cases where the browser is closed while the temporary file is open in the application 104. The second process automatically deletes the file after the temporary file is closed.

Figure 2:
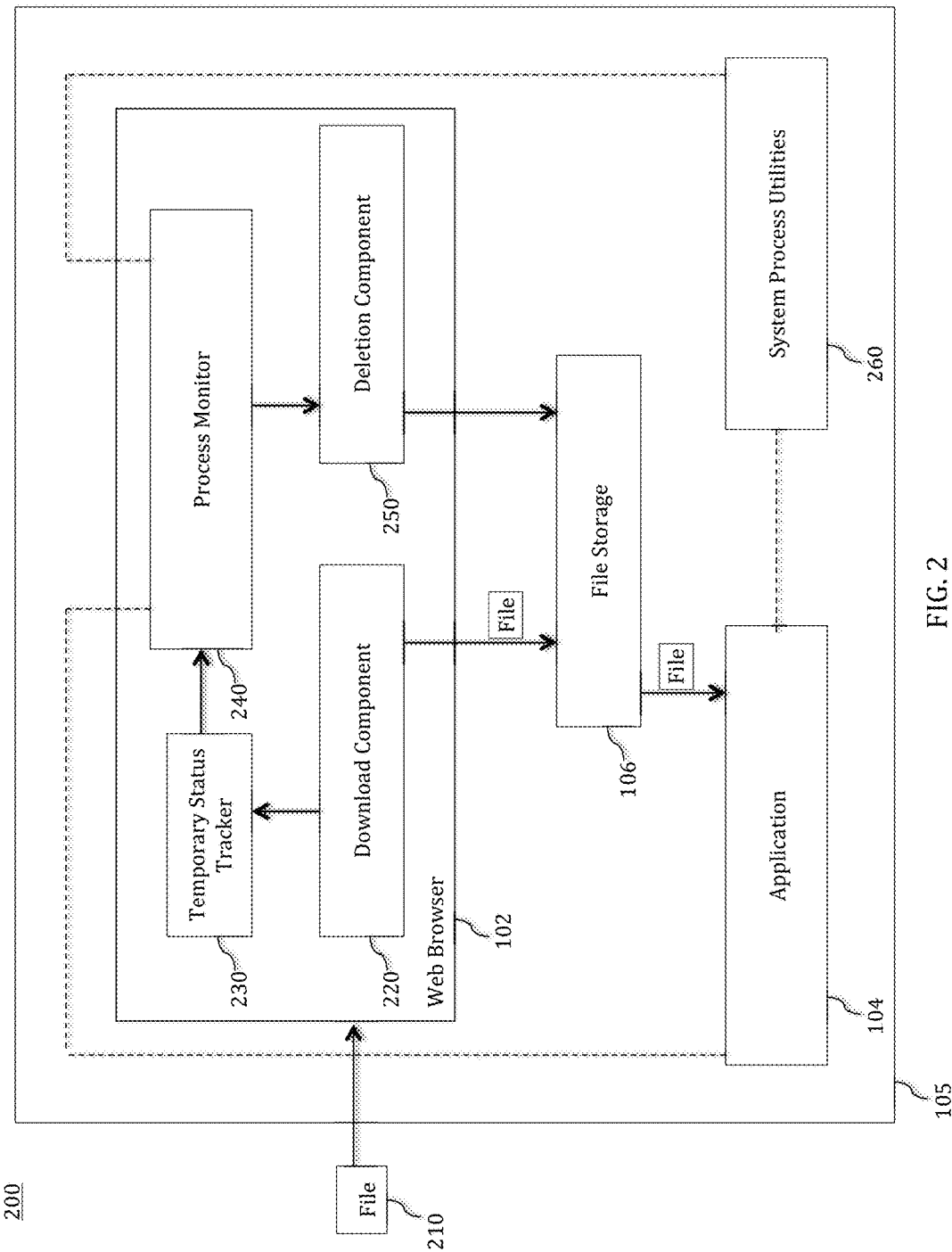
FIG. 2 further illustrates the client system described relative to FIG. 1, according to one embodiment.

FIG. 2 further illustrates the client system 105, according to one embodiment. As shown, client system 105 includes a web browser 102, an application 104, file storage 106, and system process utilities 260. In one embodiment, the web browser 102 includes a download component 220, temporary status tracker 230, a process monitor 240, and a deletion component 250.

The download component 220 downloads a file 210 at the request of a user. The download component 220 saves the file in file storage 106 and notifies the temporary status tracker 230. The download component 220 may prompt the user to choose whether to open the file 210 or save the file 210. If the user elects to open the file 210, the download component 220 may prompt the user to specify whether the file 210 should be retained for temporary use.

The temporary status tracker 230 monitors a status of the downloaded file 210. For example, the temporary status tracker 230 receives user selection information from the download component 220 and checks for any default settings specified by the user. Temporary status tracker 230 may allow the web browser 102 to check at closing and/or launch to determine whether any temporary files are still in use and waiting to be deleted or if any files are stored on the system storage 106 that should be deleted. Note, doing so helps ensure that closing the browser while a temporary file is open in a second application does not prevent the temporary files from being deleted.

The temporary status tracker 230 may also provide additional options to the user regarding temporary files. For example, the user may elect to delete a temporary file 210 only if the file 210 has not been accessed in a certain period of time. Temporary status tracker 230 may also provide an option for the user to see those files that are temporary and change the temporary status designation of a file 210. The temporary status tracker 230 notifies the process monitor 240 which files are temporary and updates the process monitor 240 as necessary.

The file storage 106 stores the file 210 on the client system. For example, this may be a download folder, a folder specifically for temporary files, or any other system of storing the file 210.

In one embodiment, the application 104 is executed by the client system 105 to open the downloaded file 210. For example, this may be a Portable Document Format (PDF) file viewer, an image viewer, a media player, or other program used to open the file 210 downloaded by the web browser 102. The application 104 may be code (or a plugin) within the browser designed to open non-native content such as documents and other files directly in the browser environment. The application 104 may open the downloaded file 210 alone or as one of several files open by the application 104.

In one embodiment, the process monitor 240 determines whether a user if finished using the temporary file 210. For example, the process monitor 240 can track whether application 104 (or any other process on system 105) is accessing the temporary file 210 or may track which files are open directly. This information is available from system process utilities 260. If the process monitor 240 determines that the temporary file 210 has been closed, process monitor 240 instructs the deletion component 250 to delete the file 210.

System process utilities 260 generally represent the process management utilities typically available to query the operating system about a run-time state, e.g., what processes are running, what files are open, and what process is launched or "owned" by another. System process utilities 260 may be used to track the processes run by the client system 105, including those run by the application 104. Usage information on processes run by the application 104 is available to the process monitor 240.

In one embodiment deletion component 250 receives an instruction from process monitor 240 that the user is finished with a temporary file 210. The deletion component 250 may then delete the file from file storage 106.

Figure 3:
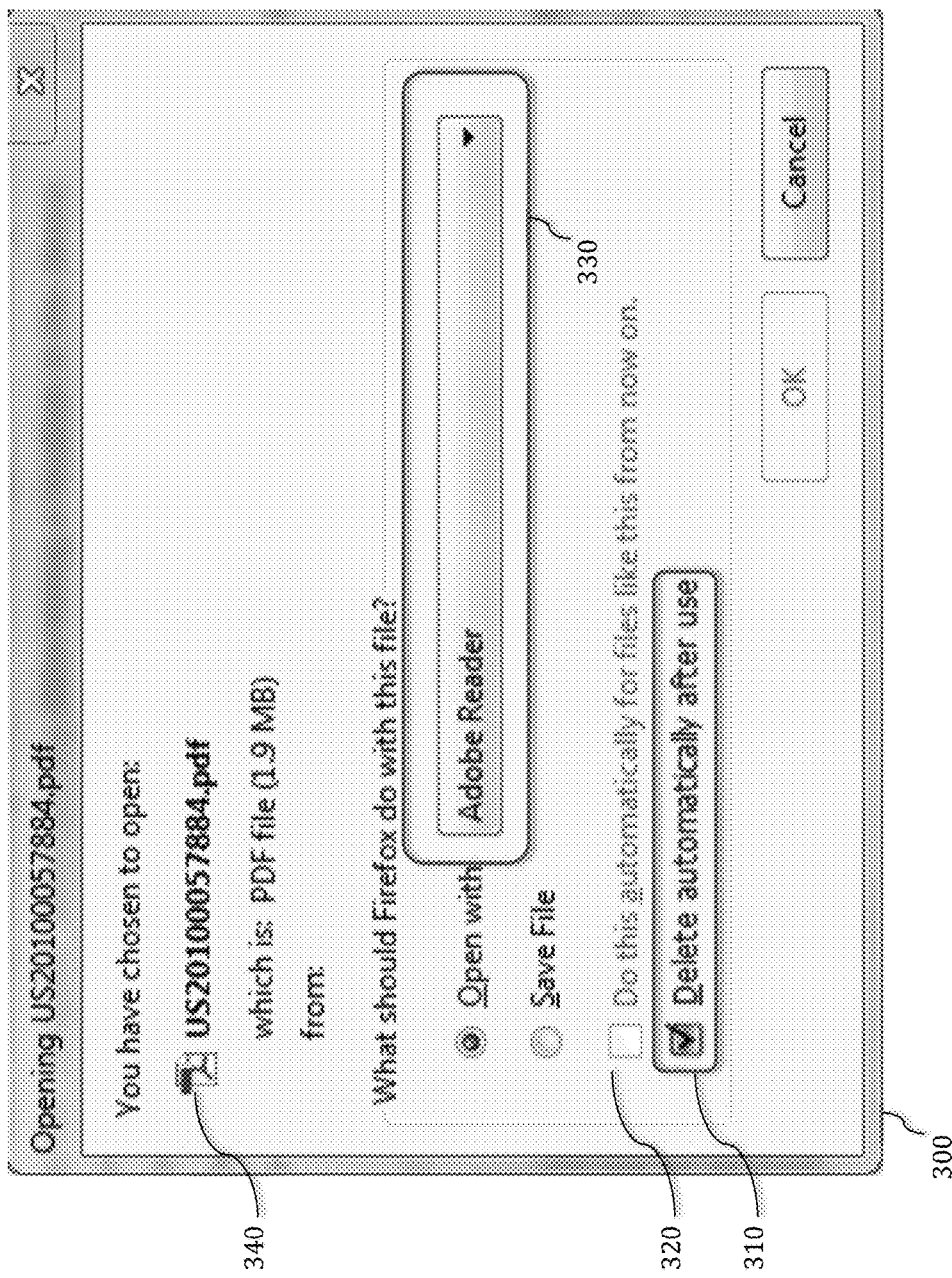
FIG. 3 illustrates an example download prompt, according to one embodiment.

FIG. 3 illustrates an example download prompt 300, according to one embodiment. As shown, file 340 is the file selected for download by the user. Application 330 is the program with which the file 340 is opened. The application 330 may be a separate program or may be code within the browser that opens non-native content and files. Temporary file option 310 provides an option for the user to designate the file 340 as temporary. Default option 320 provides an option to designate the selection made in temporary option 310 as the default selection for future download files.

Figure 4:
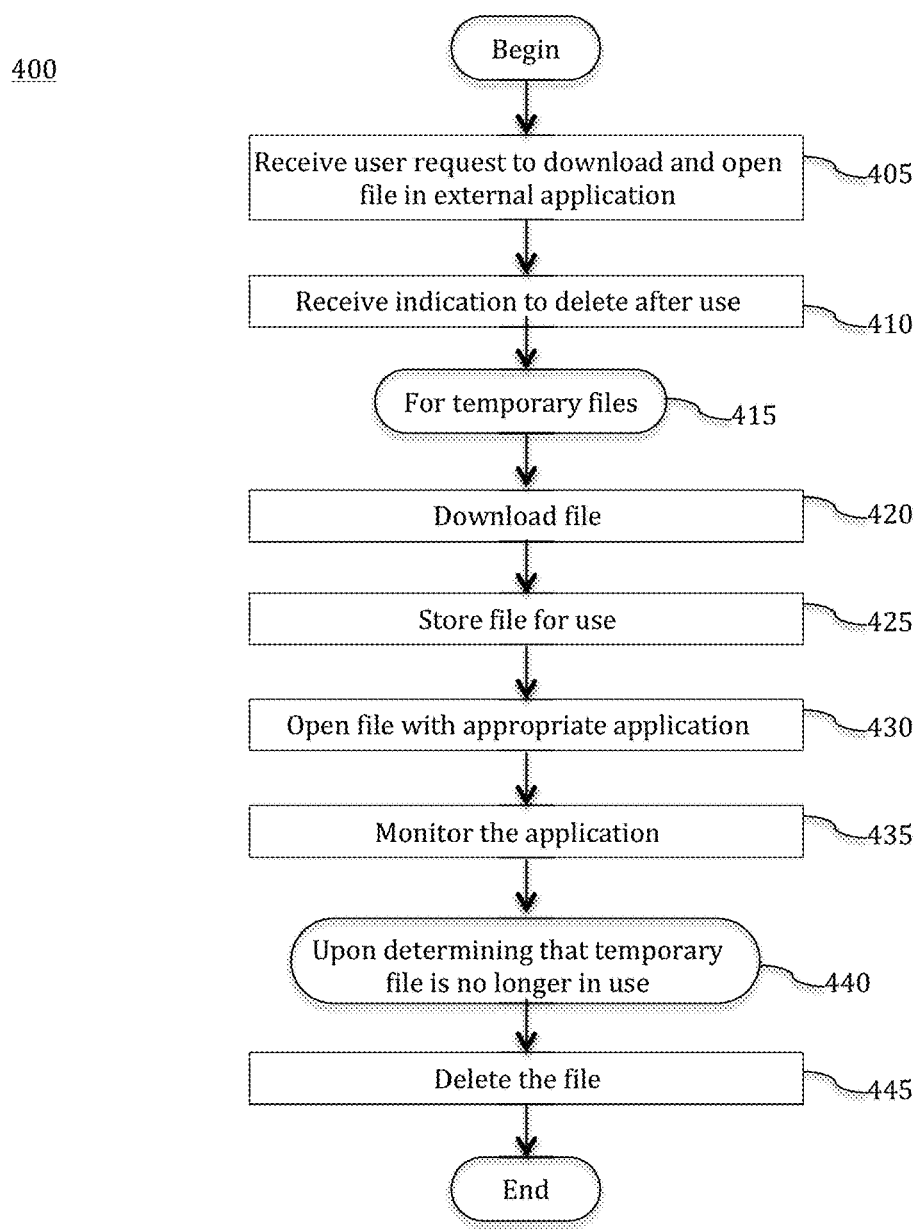
FIG. 4 illustrates a method for automatically deleting temporary use files, according to one embodiment.

FIG. 4 illustrates a method 400 for automatically deleting temporary use files, according to one embodiment. As shown, method 400 begins at step 405 where a web browser receives a user request to download and open a file 210 in an external application. A user may select the file for download through the web browser 102. At step 410, the download component receives an indication that the file selected for download is only for temporary use. The indication that the file 210 is for temporary use may be done by default, or as a user selection as illustrated in example download prompt 300.

As shown at step 415, the method 400 continues for those files selected for temporary use. If the file 210 is not selected for temporary use, the web browser 102 may open the file 210 and treat as any other downloaded file is generally used, and the method 400 ends. At step 420 the download component 220 downloads the file 210, and at step 425 the download component stores the file 210 in file storage 106. At step 430, the application 104 opens the file 210. At step 435, once the file 210 is opened by the application 104, the process monitor 240 monitors the application to determine whether the user is still using the file 210.

At step 440, if the user closes the application 104 using the file 210, or if the user closes the file 210 window within the application, then the process monitor 240 can determine that the file 210 is no longer in use. At step 445, the deletion component 250 deletes the file 210 from file storage 106.

Figure 5:
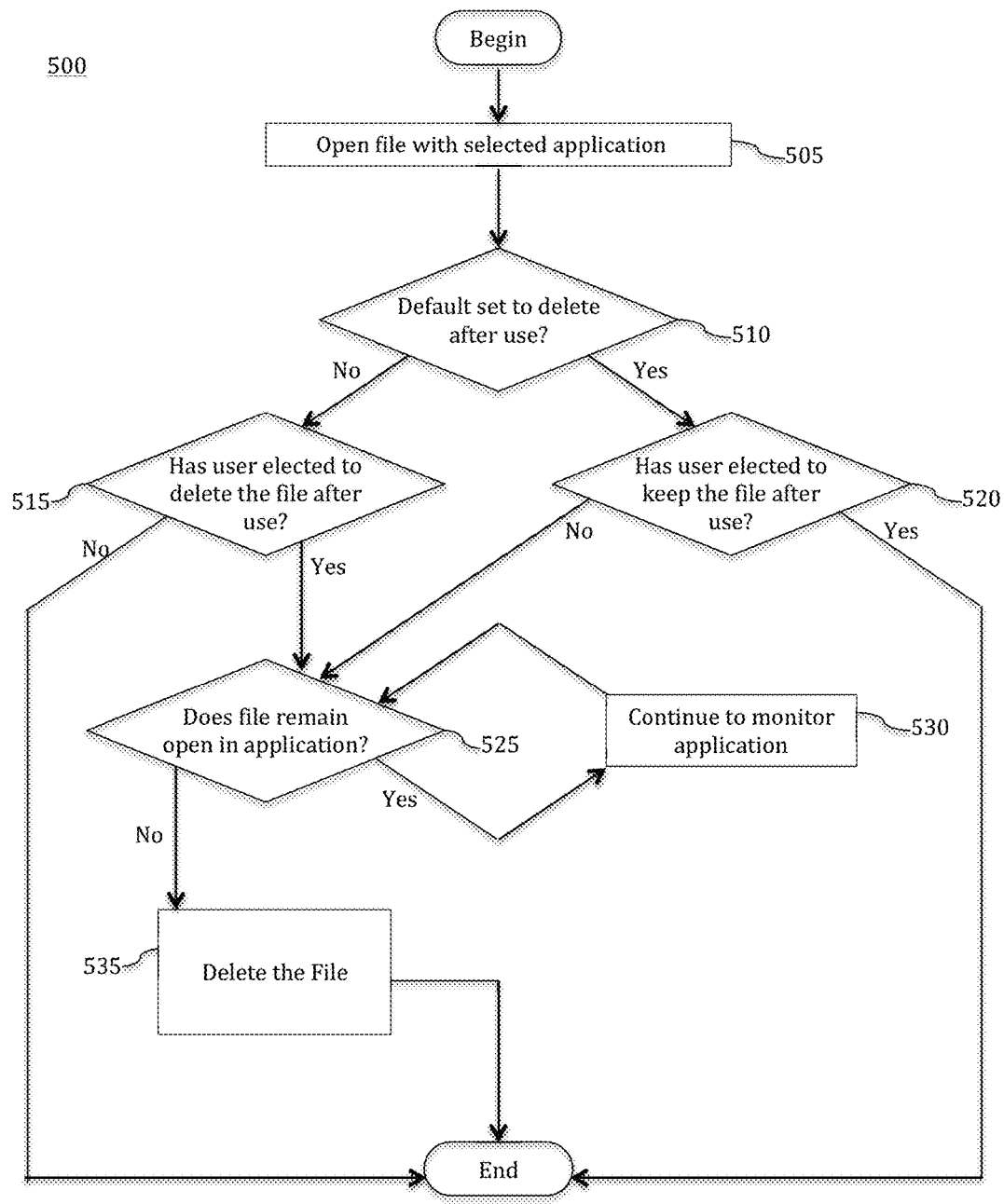
FIG. 5 illustrates a method for ascertaining whether a file is for temporary use, determining whether a user is finished with that file, and deleting the file, according to one embodiment.

FIG. 5 illustrates a method 500 for determining whether a file 210 is for temporary use, determining whether a user is finished with that file 210, and deleting the file 210, according to one embodiment. As shown, method 500 begins at step 505 by opening the downloaded file with the selected application. This application may be any application appropriate for opening the file type downloaded. At step 510, the temporary status tracker 230 ascertains whether the default for the file 210 downloaded is for temporary use. If so, at step 520, the temporary status tracker 230 ascertains whether the user has elected to remove the temporary status, instead electing to keep the file 210 after use. If not, at step 515, the temporary status tracker 230 ascertains whether the user has elected delete the file 210 after use or otherwise indicated that the file 210 is for temporary use. If the result of step 520 is yes, the user desires to keep the file 210, or if the result of step 515 is no, the user does not select the file 210 for temporary use, then the method ends, and the file 210 can be treated as any other download file might be treated.

If the user has elected to delete the file 210 after use, either by affirmatively choosing to designate file 210 for temporary use at step 515, or by leaving a default of temporary status unchanged at step 520, then the method 500 continues to step 525. Steps 510, 515, and 520, together, determine whether the file 210 is for temporary use and should be deleted after the user has finished using the file 210, or the file 210 is not for temporary use and should be saved. For temporary files, at step 525, the process monitor 240 determines whether the file 210 is still open, indicating that the user is not yet finished with the file 210. If the file 210 is still open, the process monitor 240 continues to examine the application that is accessing file 210, as shown at step 530. If process monitor 240 determines that the file 210 is no longer open, the deletion component 250 deletes the file 210.

Figure 6:
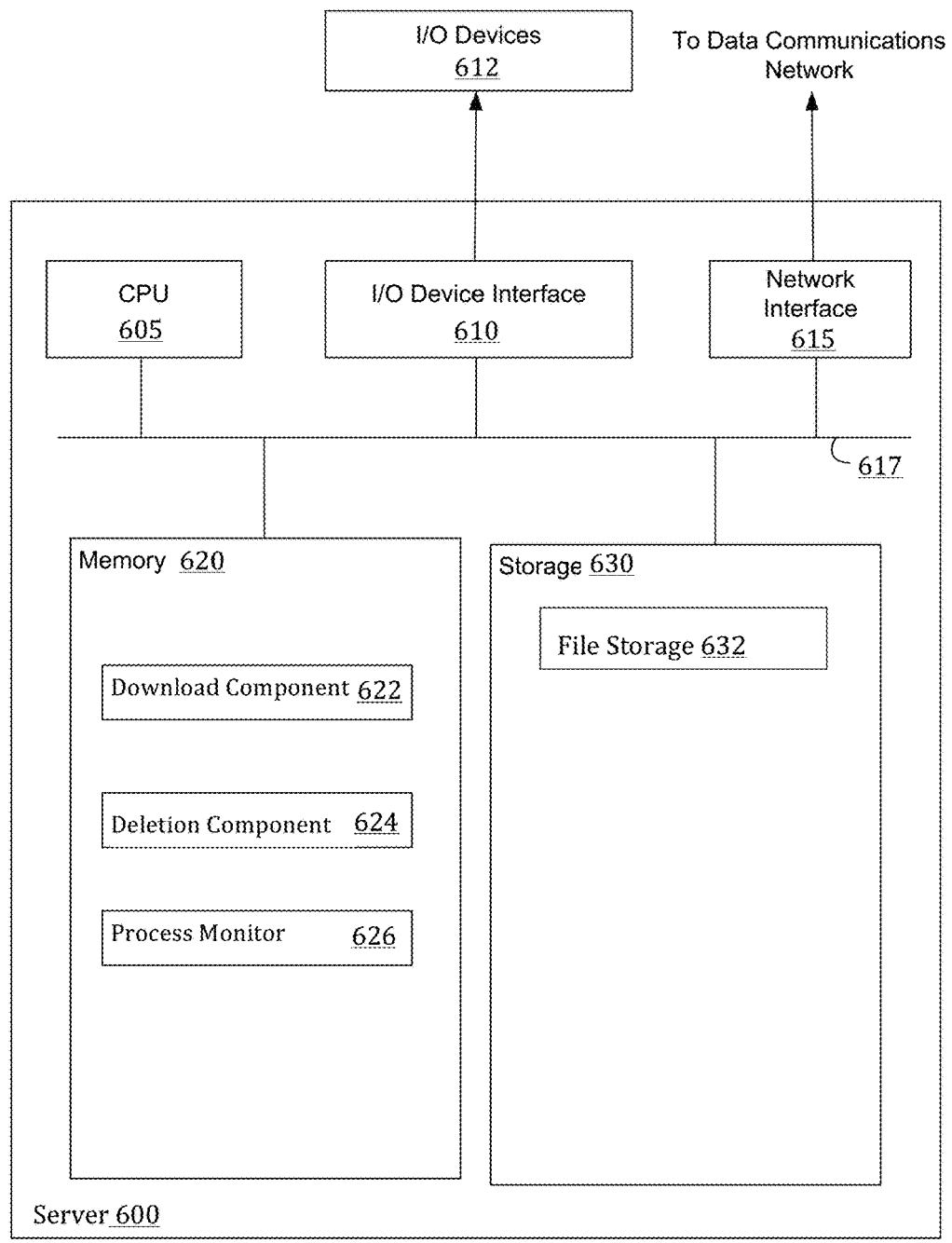
FIG. 6 illustrates an example client system, according to one embodiment.

FIG. 6 illustrates an example client system 600, according to one embodiment. As shown, the client system 600 includes, without limitation, a central processing unit (CPU) 605, a network interface 615, a memory 620, and storage 630, each connected to a bus 617. The client system 600 may also include an I/O device interface 610, connecting I/O devices 612 (e.g., keyboard, display and mouse devices) to the client system 600. Further, in context of this disclosure, the computing elements shown in the client system 600 may correspond to a physical computing system (e.g., a personal computer) or may be a virtual computing instance executing within a computing cloud.

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 617, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS) or a storage area-network (SAN).

Illustratively, memory 620 includes a download component 622, a deletion component 624, and a process monitor 626. The download component 622 downloads a user-selected file 210 and may obtain user input regarding the temporary status of the file 210. For example, this may be a checkbox, or other form of asking the user if the file 210 should be deleted after use. The file 210 can be saved in file storage 632 in a particular location for temporary files, or any other location selected by the program or the user. The process monitor 626 monitors the use of temporary files by other applications to determine if the user is still accessing the file 210. The process monitor 626 may observe processes running, and/or may observe a list of open files. If the process monitor 626 determines that the user is finished with the file 210 designated for temporary use, then the process monitor 626 directs deletion component 624 to delete the file 210 from file storage 732.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a web browser) or related data available in the cloud. For example, the web browser could execute on a computing system in the cloud and delete temporary download files automatically. In such a case, the web browser could ascertain whether a user intends for a file to be deleted after use and store such an indication at a storage location in the cloud. Doing so allows a user to access this web browser and associated information from any computing system attached to a network connected to the cloud (e.g., the Internet). Furthermore, some users may purchase cloud-based storage by the number of files or amount of data stored. Deleting temporary files may help optimize how these purchased resources are utilized.

While the foregoing is directed to embodiments of the present invention, other and further embodiments of the invention may be devised without departing from the basic scope thereof, and the scope thereof is determined by the claims that follow.

What is claimed is:

1. A computer-implemented method for managing files downloaded by a first application, the method comprising:
    receiving, by operation of a processor, a request for the first application to download a file from a network to a client device for use by a second application;
    in response to the request:
        in response to receiving, in a graphical user interface, an indication that the file is for temporary use, transmitting a temporary status designation to a temporary status tracker component indicating that the file is for temporary use;
        notifying, by the temporary status tracker component, a process monitoring component that the file is for temporary use;
        downloading the file from the network;
        storing the file on the client device;
        launching the second application to open the downloaded file;
    upon determining the file was opened for temporary use with the second application:
        monitoring a state of the file indicating whether the file remains in use by the second application; and
        upon determining that the file no longer remains in use by the second application, deleting the file from the client device.

2. The method of claim 1, wherein the first application is a web browser application and the request to download a file is selected from a web page rendered by the web browser application.

3. The method of claim 1, wherein determining the file was opened for temporary use with the second application comprises:
    prompting a user to designate whether to download the file for temporary use.

4. The method of claim 1, wherein determining that the file is no longer open in the second application comprises:
    determining that the process accessing the file has been terminated.

5. The method of claim 1, wherein determining that the file is no longer open in the second application comprises:
    determining that the second application no longer has an open file handle to the file.

6. The method of claim 1, wherein monitoring the state of the file indicating whether the file is open in the second application comprises:
    determining a process identifier of the second application; and
    monitoring, based on the process identifier, a set of one or more files opened by the second application.

7. The method of claim 1, wherein monitoring the state of the file indicating whether the file is open in the second application comprises:
    adding an indication of the file to a log of temporary files downloaded by the first application for use by one or more second applications;
    periodically, evaluating the log of temporary files to identify one or more temporary files that can be deleted.

8. A system, comprising:
    a processor; and
    a memory storing a program, which, when executed on the processor, performs an operation, the operation comprising:
        receiving, by operation of the processor, a request for a first application to download a file from a network to a client device for use by a second application;
        in response to the request:
            in response to receiving, in a graphical user interface, an indication that the file is for temporary use, transmitting a temporary status designation to a temporary status tracker component indicating that the file is for temporary use;
            notifying, by the temporary status tracker component, a process monitoring component that the file is for temporary use;
            downloading the file from the network;
            storing the file on the client device;
            launching the second application to open the downloaded file;
        upon determining the file was opened for temporary use with the second application:
            monitoring a state of the file indicating whether the file is open in the second application; and
            upon determining that the file is no longer open in the second application, deleting the file from the client device.

9. The system of claim 8, wherein the first application is a web browser application and the request to download a file is selected from a web page rendered by the web browser application.

10. The system of claim 8, wherein determining the file was opened for temporary use with the second application comprises:

prompting a user to designate whether to download the file for temporary use.

11. The system of claim 8, wherein determining that the file is no longer open in the second application comprises:
   determining that the process accessing the file has been terminated.

12. The system of claim 8, wherein determining that the file is no longer open in the second application comprises:
   determining that the second application no longer has an open file handle to the file.

13. The system of claim 8, wherein monitoring the state of the file indicating whether the file is open in the second application comprises:
   determining a process identifier of the second application; and
   monitoring, based on the process identifier, a set of one or more files opened by the second application.

14. The system of claim 8, wherein monitoring the state of the file indicating whether the file is open in the second application comprises:
   adding an indication of the file to a log of temporary files downloaded by the first application for use by one or more second applications;
   periodically, evaluating the log of temporary files to identify one or more temporary files that can be deleted.

15. A computer-readable storage medium storing instructions, which, when executed on a processor, performs an operation for managing files downloaded by a first application, the operation comprising:
   receiving a request for a first application to download a file from a network to a client for use by a second application;
   in response to the request:
      in response to receiving, in a graphical user interface, an indication that the file is for temporary use, transmitting a temporary status designation to a temporary status tracker component indicating that the file is for temporary use;
      notifying, by the temporary status tracker component, a process monitoring component that the file is for temporary use;
      downloading the file from the network;
      storing the file on the client device;
      launching the second application to open the downloaded file;
   upon determining the file was opened for temporary use with the second application:
      monitoring a state of the file indicating whether the file is open in the second application; and
      upon determining that the file is no longer open in the second application, deleting the file from the client device.

16. The computer-readable storage medium of claim 15, wherein the first application is a web browser application and the request to download a file is selected from a web page rendered by the web browser application.

17. The computer-readable storage medium of claim 15, wherein determining the file was opened for temporary use with the second application comprises:
   prompting a user to designate whether to download the file for temporary use.

18. The computer-readable storage medium of claim 15, wherein determining that the file is no longer open in the second application comprises:
   determining that the process accessing the file has been terminated.

19. The computer-readable storage medium of claim 15, wherein determining that the file is no longer open in the second application comprises:
   determining that the second application no longer has an open file handle to the file.

20. The computer-readable storage medium of claim 15, wherein monitoring the state of the file indicating whether the file is open in the second application comprises:
   determining a process identifier of the second application; and
   monitoring, based on the process identifier, a set of one or more files opened by the second application.

* * * * *